(12) United States Patent
Mori

(10) Patent No.: US 8,131,798 B2
(45) Date of Patent: Mar. 6, 2012

(54) IMAGE PROCESSING SYSTEM, INFORMATION PROCESSING APPARATUS, CONTROL METHODS THEREOF, AND PROGRAM

(75) Inventor: Ryuta Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 12/714,290

(22) Filed: Feb. 26, 2010

(65) Prior Publication Data

US 2010/0235424 A1  Sep. 16, 2010

(30) Foreign Application Priority Data

Mar. 16, 2009 (JP) .................................. 2009-063233

(51) Int. Cl.
*G06F 15/16* (2006.01)

(52) U.S. Cl. .................. 709/202; 709/224; 358/474

(58) Field of Classification Search .......... 709/200–203, 709/217–227; 358/474
See application file for complete search history.

(56) References Cited

U.S. PATENT DOCUMENTS 6,353,840 B2 *  3/2002  Saito et al. .................... 715/202
6,980,332 B2 * 12/2005  Simske .......................... 358/445
2007/0143674 A1 *  6/2007  Daos et al. .................... 715/530
2010/0241990 A1 *  9/2010  Gabriel et al. ................ 715/810
2010/0302604 A1 * 12/2010  Kodimer et al. .............. 358/474

FOREIGN PATENT DOCUMENTS

JP  2001-217980  8/2001
JP  2004-295695  10/2004

* cited by examiner

*Primary Examiner* — Moustafa M Meky
(74) *Attorney, Agent, or Firm* — Fitzpatrick, Cella, Harper & Scinto

(57) ABSTRACT

This invention provides an image processing system and information processing apparatus, which can improve user's operability upon execution of a workflow without causing any productivity or reliability drop, and control methods thereof. To accomplish this, an information processing apparatus included in this image processing system receives digital data of a document read by an image processing apparatus, specifies feature information of the received digital data, and executes matching between the specified feature information and a plurality of templates. The information processing apparatus acquires a processing status of a workflow which is being currently executed from a workflow server. When a process indicated by attribute information of a template whose matching has succeeded matches a process indicated by the acquired processing status, the information processing apparatus registers the digital data in a document server as a document.

15 Claims, 16 Drawing Sheets

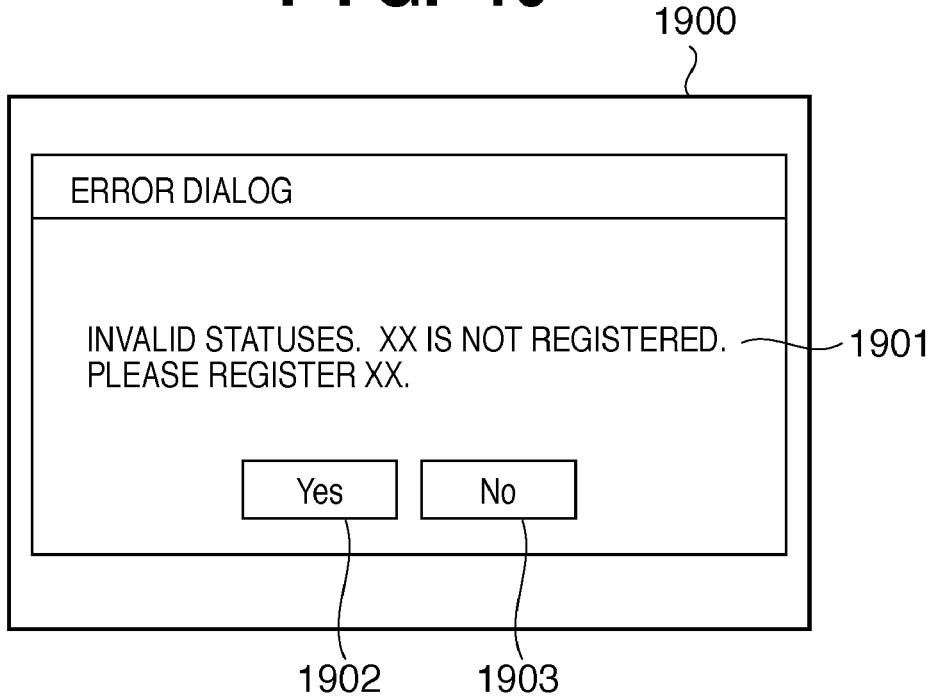
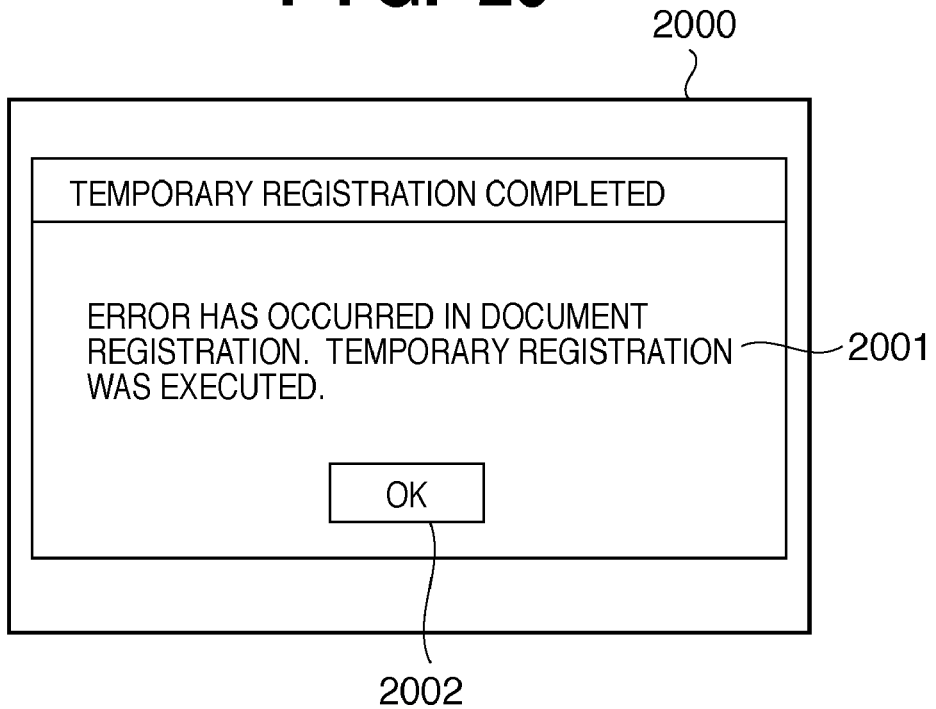

IMAGE PROCESSING SYSTEM, INFORMATION PROCESSING APPARATUS, CONTROL METHODS THEREOF, AND PROGRAM

BACKGROUND OF THE INVENTION

1. Field of the Invention

The present invention relates to an image processing system which registers a read document, an information processing apparatus, control methods thereof, and a program.

2. Description of the Related Art

In recent years, a multi-function peripheral (MFP) has advanced as an image processing apparatus having a plurality of functions of, e.g., a printer, copying machine, and facsimile apparatus. Furthermore, such MFP has a function of executing a workflow of a job in cooperation with a workflow server on a network.

Japanese Patent Laid-Open No. 2004-295695 has proposed a technique which associates data scanned by an MFP with a workflow of a workflow server. With this technique, the user can execute scan processing by selecting a workflow to be executed from an operation panel on the MFP.

Japanese Patent Laid-Open No. 2001-217980 has proposed a technique which collates template data registered in advance with scanned data, and executes subsequent processes defined in a template which matches the scanned data. In this way, the scanned data can be efficiently associated with the subsequent processes.

However, the aforementioned related arts suffer problems to be described below. For example, in the related art, the user has to execute processing while associating a document to be scanned and a workflow with each other to have one-to-one correspondence via the operation panel on the MFP. Therefore, since a plurality of types of documents cannot be scanned while being associated with workflows at one time, the productivity drops. When there are a plurality of identical document types, they have to be distinguished from each other, and the user has to repeat similar operations, thus complicating user's operations.

With the technique described in Japanese Patent Laid-Open No. 2001-217980, upon associating scanned data with the subsequent processes, for example, the processing statuses of the subsequent processes are not taken into consideration at all. For this reason, when the subsequent processes are to associate data with a workflow, data which can be associated only in case of a predetermined status may be associated at the time of a regular status. Therefore, the reliability of data associated with a workflow drops.

SUMMARY OF THE INVENTION

The present invention enables realization of an image processing system and information processing apparatus which can improve user's operability upon execution of a workflow without any productivity or reliability drop, control methods thereof, and a program.

One aspect of the present invention provides an image processing system comprising a workflow server, a template server, and an image processing apparatus, the workflow server comprising a first storage unit that stores a workflow in which a plurality of processes are defined, and a management unit that manages a processing status of the workflow stored in the first storage unit; the image processing apparatus comprising a reading unit that reads a document and outputs digital data, and a transmission unit that transmits the digital data output from the reading unit to the template server; and the template server comprising a second storage unit that stores templates each indicating a feature of a document in association with specific processes included in the workflow managed by the workflow server, a generation unit that generates feature information from the digital data transmitted by the transmission unit, a specifying unit that specifies a process which is defined in the workflow stored in the first storage unit, based on the feature information generated by the generation unit and the templates stored in the template server, a judging unit that judges, based on a processing status, managed by the management unit, of the workflow which defines the process specified by the specifying unit, whether or not to execute the process, and a processing unit that processes, in a case where the judging unit judges that the process specified by the specifying unit is to be executed, the digital data output from the reading unit.

Another aspect of the present invention provides an information processing apparatus which is configured to be connected to a workflow server that stores a workflow in which a plurality of processes are defined, and manages a processing status of the stored workflow, and an image processing apparatus that transmits digital data which is output by reading a document, the apparatus comprising: a storage unit that stores templates each indicating a feature of a document in association with specific processes included in the workflow managed by the workflow server; a generation unit that generates feature information from the digital data transmitted from the image processing apparatus; a specifying unit that specifies a process which is stored in the storage unit and is defined in the workflow, based on the feature information generated by the generation unit and the templates stored in the storage unit; a judging unit that judges, based on a processing status, managed by the workflow server, of the workflow which defines the process specified by the specifying unit, whether or not to execute the process; and a processing unit that processes, in a case where the judging unit judges that the process specified by the specifying unit is to be executed, the digital data output from the image processing apparatus.

Still another aspect of the present invention provides a method of controlling an image processing system comprising a workflow server, a template server, and an image processing apparatus, the method comprising: causing the workflow server to execute storing a workflow in which a plurality of processes are defined, and managing a processing status of the workflow stored in the storing the workflow; causing the image processing apparatus to execute reading a document and outputting digital data, and transmitting the digital data output in the reading to the template server; and causing the template server to execute storing templates each indicating a feature of a document in association with specific processes included in the workflow managed by the workflow server, generating feature information from the digital data transmitted in the transmitting, specifying a process defined in the workflow stored in the storing the workflow, based on the feature information generated in the generating and the templates stored in the template server, judging, based on a processing status, managed in the managing, of the workflow which defines the process specified in the specifying, whether or not to execute the process, and processing, in a case where it is judged in the judging that the process specified in the specifying is to be executed, the digital data output in the reading.

Yet still another aspect of the present invention provides a method of controlling an information processing apparatus which is configured to be connected to a workflow server that stores a workflow in which a plurality of processes are defined, and manages a processing status of the stored workflow, and an image processing apparatus that transmits digital data which is output by reading a document, the method comprising: storing templates each indicating a feature of a document in association with specific processes included in the workflow managed by the workflow server; generating feature information from the digital data transmitted from the image processing apparatus; specifying a process which is stored in the storing and is defined in the workflow, based on the feature information generated in the generating and the templates stored in the storing; judging, based on a processing status, managed by the workflow server, of the workflow which defines the process specified in the specifying, whether or not to execute the process; and processing, in a case where it is judged in the judging that the process specified in the specifying is to be executed, the digital data output from the image processing apparatus.

Still yet another aspect of the present invention provides a computer-readable storage medium storing a computer program for making a computer execute respective steps in a method of controlling the image processing system.

Yet still another aspect of the present invention provides a computer-readable storage medium storing a computer program for making a computer execute respective steps in a method of controlling the information processing apparatus.

Further features of the present invention will be apparent from the following description of exemplary embodiments with reference to the attached drawings.

BRIEF DESCRIPTION OF THE DRAWINGS

FIG. 19 is a view showing a display screen 1900 displayed on the MFP 100 according to the embodiment;

FIG. 20 is a view showing a display screen 2000 displayed on the MFP 100 according to the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Arrangement>

Figure 1:
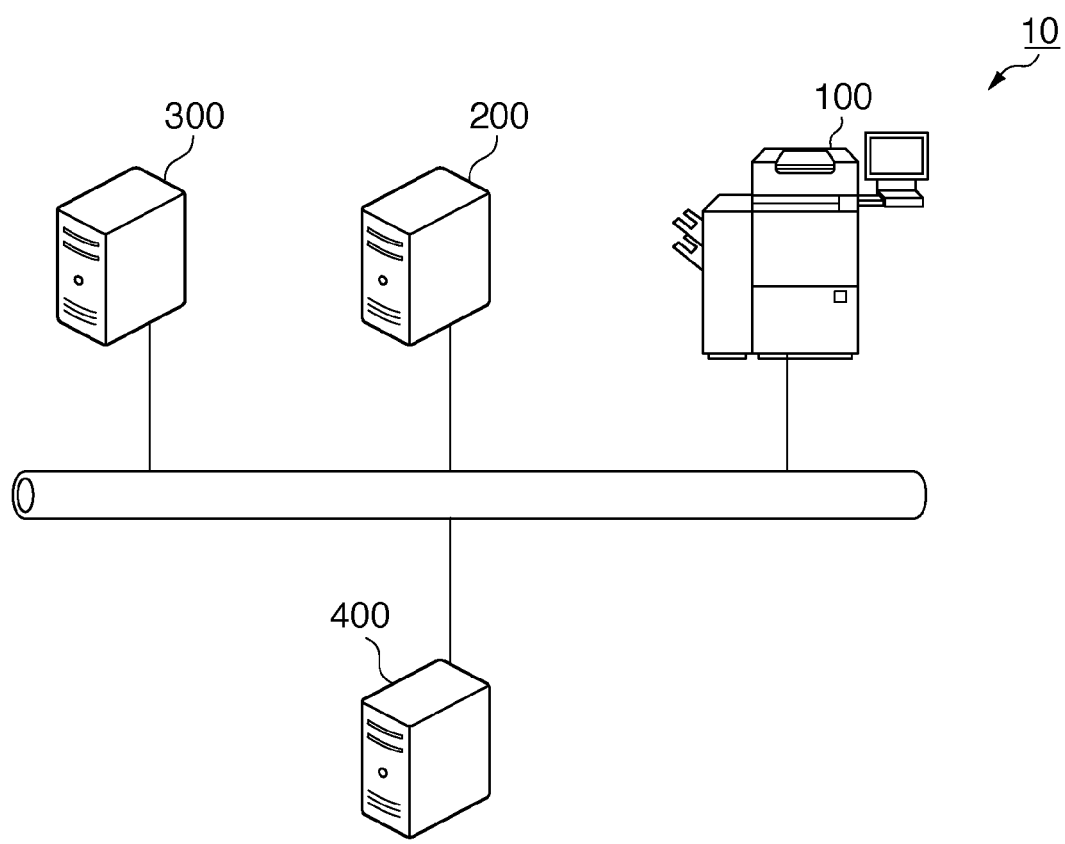
FIG. 1 is a diagram showing an example of the arrangement of an image processing system according to an embodiment of the present invention.

An embodiment of the present invention will be described hereinafter with reference to FIGS. 1 to 21. FIG. 1 is a diagram showing an example of the arrangement of an image processing system according to this embodiment.

An image processing system 10 includes an MFP (Multi-Function Peripheral) 100 as an image processing apparatus, a template server 200 as an information processing apparatus, a workflow server 300, and a document server 400. The MFP 100 has a plurality of functions including a scan function, print processing function, and various communication functions, and provides various services to the user by communicating with the respective servers in the image processing system 10. The MFP 100 includes an operation panel which allows the user to control various services.

The template server 200 provides a function as a characteristic feature of the present invention. More specifically, the template server 200 applies OCR (Optical Character Reader) processing to form data of various digital documents. With this processing, the template server 200 recognizes static information such as ruled line information, and saves that data as a template indicating a feature of the document. When the data is saved as a template, information of, e.g., a workflow which uses that template is simultaneously saved as attribute information. Note that the OCR processing is to optically read character data, graphic data, and the like, collate them with pattern data, which are stored in advance, and recognize and specify characters and graphics.

The workflow server 300 holds workflows which define a plurality of processes and processing procedures of various job flows, and manages the processing status of a workflow which is being executed. The workflow server 300 has a function of executing, e.g., new slip issue processing and status acquisition processing of the workflow which is being currently executed in response to an inquiry and request from the template server 200, and responding to the template server 200. For example, the workflow server 300 manages workflows which define processes corresponding to slip issue, approval, and settlement work steps with respect to objects to be processed such as application forms and slips, and their processing procedures, so as to automate business procedures. Note that one job flow corresponds to one workflow. One workflow includes a plurality of processes (work steps). Furthermore, in order to complete each of processes, documents to be linked (associated) are defined, and processes are completed by correctly linking these documents, thus eventually completing one workflow. Completion states of respective processes in the workflow are held in the form of "statuses (processing statuses)" as attribute information, which can be acquired from an external system.

The document server 400 receives data from the template server 200, and saves the received data in a storage device while, e.g., compressing it. The document server 400 also manages a search, deletion, and the like based on, e.g., attribute information.

<Arrangement of Template Server 200>

Figure 2:
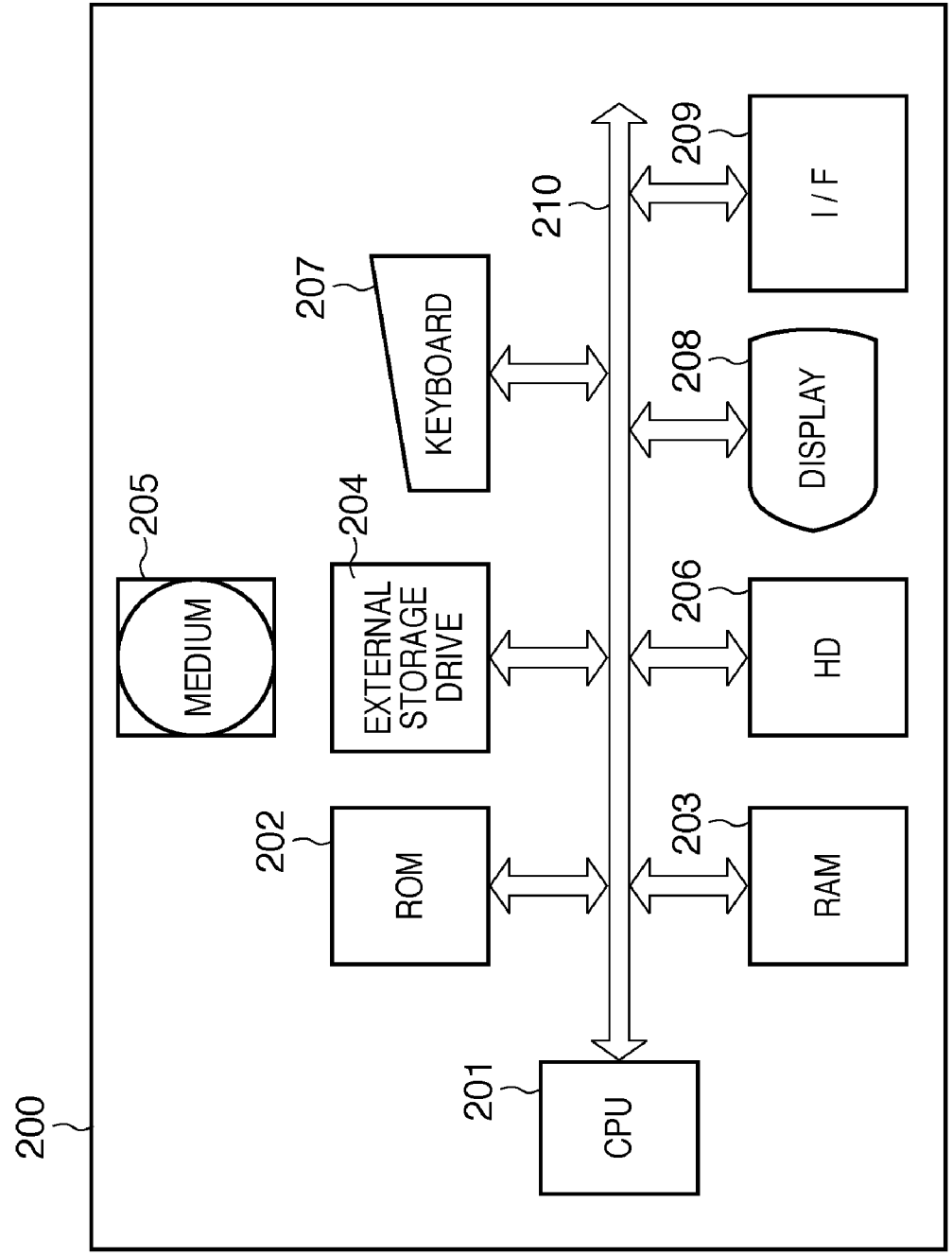
FIG. 2 is a block diagram showing the hardware arrangement of a template server 200 as an information processing apparatus according to the embodiment.

FIG. 2 is a block diagram showing the hardware arrangement of the template server 200 as an information processing apparatus according to this embodiment. Note that the basic arrangements of the workflow server 300 and document server 400 are also the same as that of the template server 200 to be described below.

A CPU 201 executes application programs, a printer driver program, an OS, a network printer control program, and the like, which are stored in an HD (Hard Disk) 206. The CPU 201 temporarily stores, in a RAM 203, information, files, and the like, which are required to execute the programs. A ROM 202 stores programs such as a basic I/O program, and various data such as font data and template data used in case of document processing. The RAM 203 serves as a main memory, work area, and the like of the CPU 201. Reference numeral 204 denotes an external storage drive, which can load programs and the like stored in a medium 205 to this computer system.

Reference numeral 205 denotes a medium which stores programs and related data required to execute processing to be described in this embodiment. The storage contents of the medium 205 will be described later using FIG. 3. These programs and related data may be pre-stored in the HD 206, ROM 202, and the like, as described above. Reference numeral 206 denotes an HD which stores application programs, a printer driver program, an OS, control programs, related programs, and the like. Reference numeral 207 denotes a keyboard, which is an input device that allows the user to input device control commands and the like to the template server 200. Reference numeral 208 denotes a display which is a display device that displays commands input from the keyboard 207, a printer state, and the like. Reference numeral 210 denotes a system bus that controls data flows in the template server 200. Reference numeral 209 denotes a network interface (to be abbreviated as "I/F" hereinafter), which is a communication interface used to connect a local area network (LAN) or the Internet.

<Memory Map>

Figure 3:
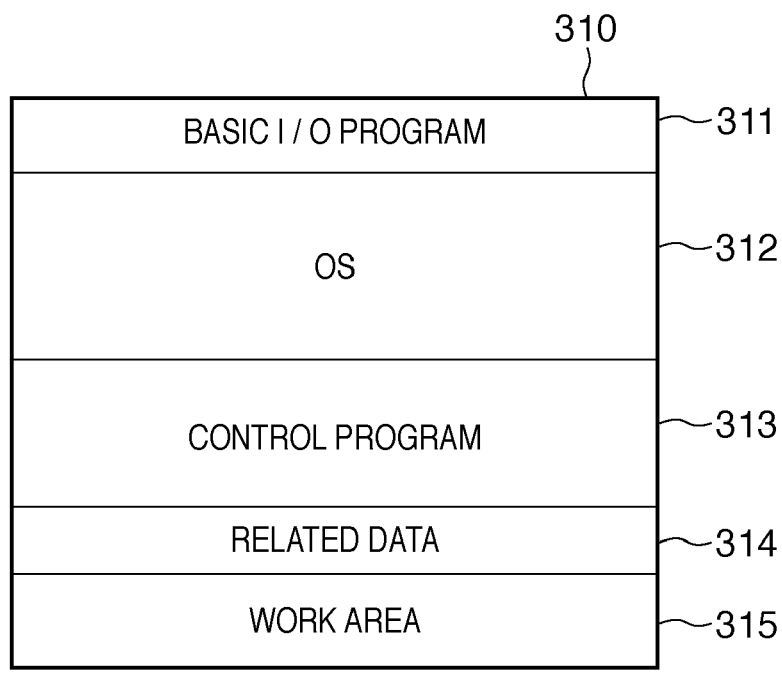
FIG. 3 is a view showing a state in which programs required to execute processing according to the embodiment are loaded onto a RAM 203.

An example of the programs, which are required to execute the processing of this embodiment, and are stored in the ROM 202, HD 206, or medium 205 shown in FIG. 2, will be described below with reference to FIG. 3. FIG. 3 is a view showing a state in which the programs required to execute the processing according to this embodiment are loaded onto the RAM 203. A case will be exemplified below wherein the programs required to execute the processing according to this embodiment are loaded from the medium 205 onto the RAM 203.

In the example to be described below, programs and related data are directly loaded from the medium 205 onto the RAM 203 at the time of execution. Alternatively, these programs and related data may be temporarily stored in the HD 206 and may then be loaded onto the RAM 203. The medium 205 may include any of an FD, CD-ROM, DVD, and IC memory card.

A memory map 310 loaded onto the RAM 203 include a basic I/O program 311, OS 312, control program 313, related data 314, and work area 315. The basic I/O program 311 has an IPL (Initial Program Loading) function which controls to load the OS 312 from the HD 206 onto the RAM 203 and to start to run the OS 312 when the power supply of the template server 200 is turned on. The work area 315 is used when the CPU 201 executes the control program 313.

<Data Configuration>

Figure 4:
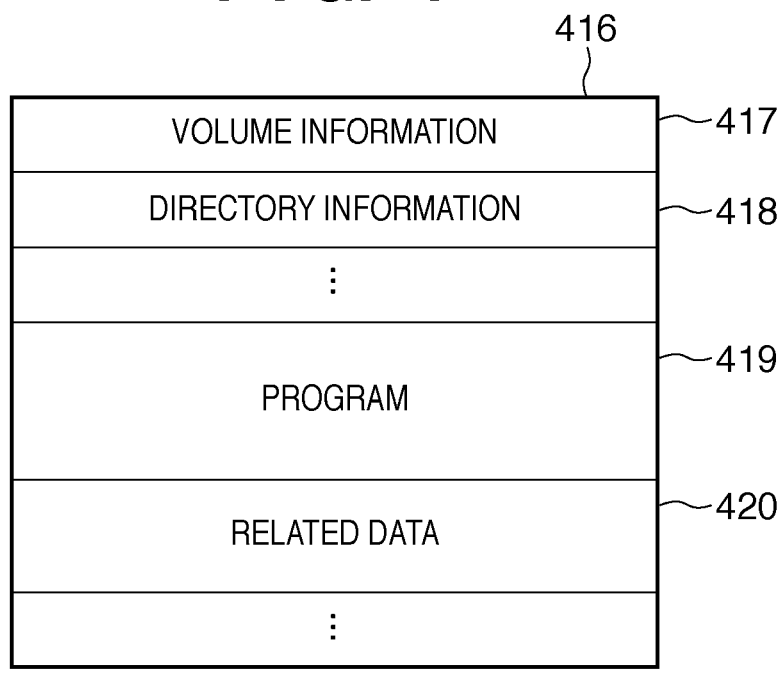
FIG. 4 is a view showing data 416 stored in a medium 205 according to the embodiment.

The data configuration stored in the medium 205 will be described below with reference to FIG. 4. FIG. 4 is a view showing data 416 stored in the medium 205 according to this embodiment.

The data 416 includes volume information 417, directory information 418, programs 419, and related data 420. The volume information 417 indicates the size of the data 416. The programs 419 are those which are required to execute the processing to be described in this embodiment. The related data 420 are those of the programs 419. The programs 419 are coded based on the flowcharts to be described later using FIGS. 6 to 12.

<Arrangement of Image Processing Apparatus>

Figure 5:
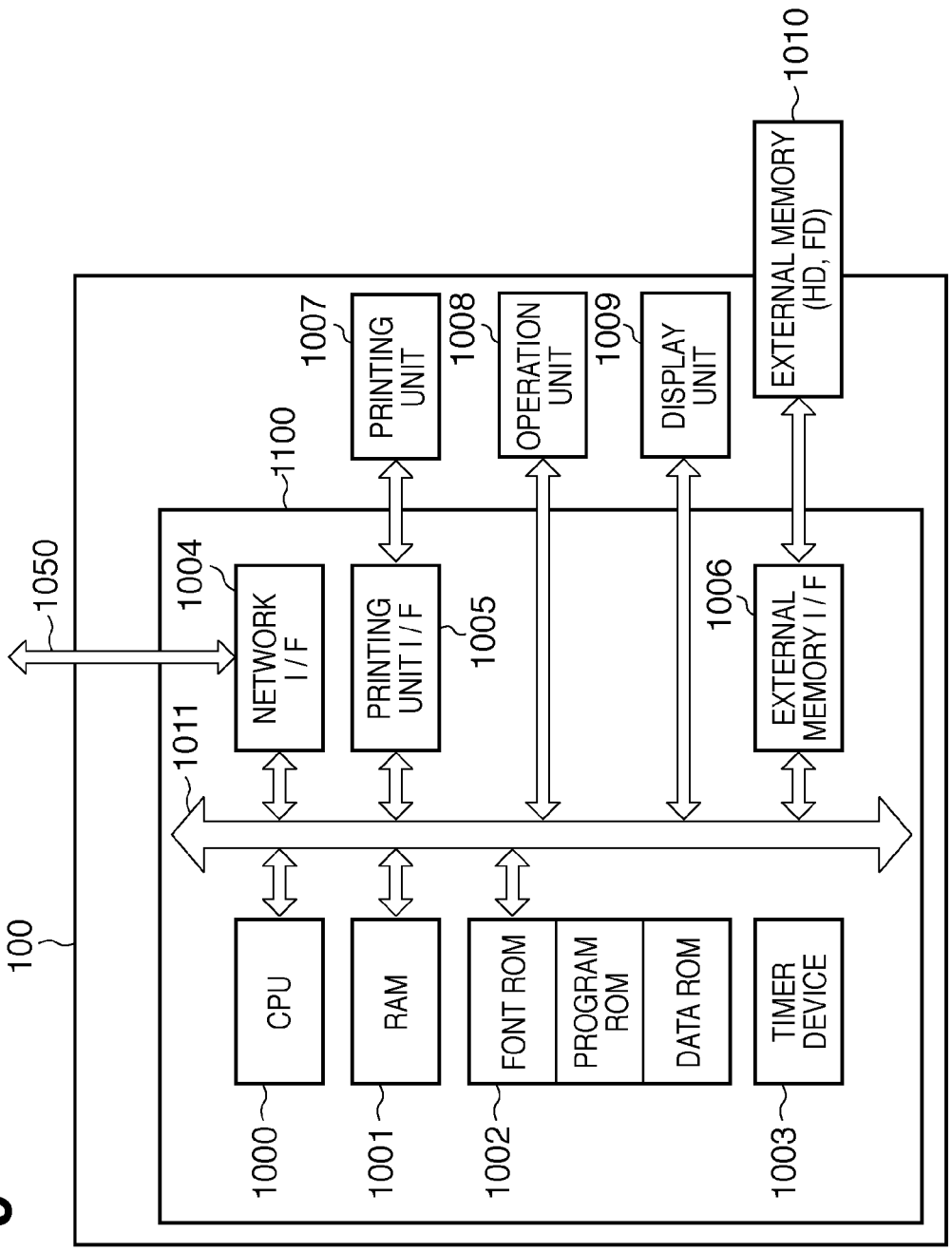
FIG. 5 is a block diagram showing an example of the arrangement of an MFP 100 according to the embodiment.

The arrangement of the MFP 100 will be described below with reference to FIG. 5. FIG. 5 is a block diagram showing an example of the arrangement of the MFP 100 according to this embodiment.

The MFP 100 includes a printing apparatus 1100, printing unit 1007, operation unit 1008, display unit 1009, and external memory 1010. The printing apparatus 1100 includes a CPU 1000, RAM 1001, ROM 1002, timer device 1003, network I/F 1004, printing unit I/F 1005, and external memory I/F 1006. The ROM 1002 includes a font ROM, program ROM, and data ROM.

The CPU 1000 executes processing based on a control program stored in the program ROM in the ROM 1002 or that stored in the external memory 1010. Then, the CPU 1000 outputs an image signal to the printing unit (printer engine) 1007 via the printing unit I/F 1005 connected to a system bus 1011. The printing unit 1007 forms an image on, e.g., a printing material according to the image signal. The printing unit 1007 includes a scanner which serves as a reading unit, and outputs digital data read from a document to the printing unit I/F 1005.

The program ROM in the ROM 1002 stores the control program for the CPU 1000 and the like. The font ROM in the ROM 1002 stores font data and the like used to generate an image signal. Furthermore, the data ROM in the ROM 1002 stores information used on the workflow server 300 and the like when the printing apparatus does not include any external memory 1010 such as a hard disk.

The CPU 1000 is connected to a network via the network I/F 1004 to be able to execute communication processing with the workflow server 300, and notifies the workflow server 300 of information in the printing apparatus 1100 and the like. The RAM 1001 serves as a main memory, work area, and the like of the CPU 1000. The memory size of the RAM 1001 can be expanded using an optional RAM connected to an expansion port (not shown). Note that the RAM 1001 is used as, e.g., an output information mapping area, environmental data storage area, and NVRAM.

The display unit 1009 informs print service users of various kinds of information. The external memory 1010 such as a hard disk (HD) or IC card is accessed under the control of the external memory I/F 1006. The external memory 1010 is connected as an option, and stores font data, an emulation program, form data, and the like. The operation unit 1008 is an operation panel that includes switches for operations, and LED indicators.

The MFP 100 may be configured to connect an option font card in addition to built-in fonts, and a plurality of external memories 1010 which store programs required to interpret printing apparatus control languages of different language systems. Furthermore, the MFP 100 may include an NVRAM, which stores printing apparatus mode setting information from the operation panel 1008. The timer device 1003 is used to check if a certificate is no longer valid. The MFP 100 may include the ROM 1002 having an equivalent timer function, or may include an equivalent function outside the printing apparatus 1100 in place of the timer device 1003.

<Control Procedure>

Figure 6:
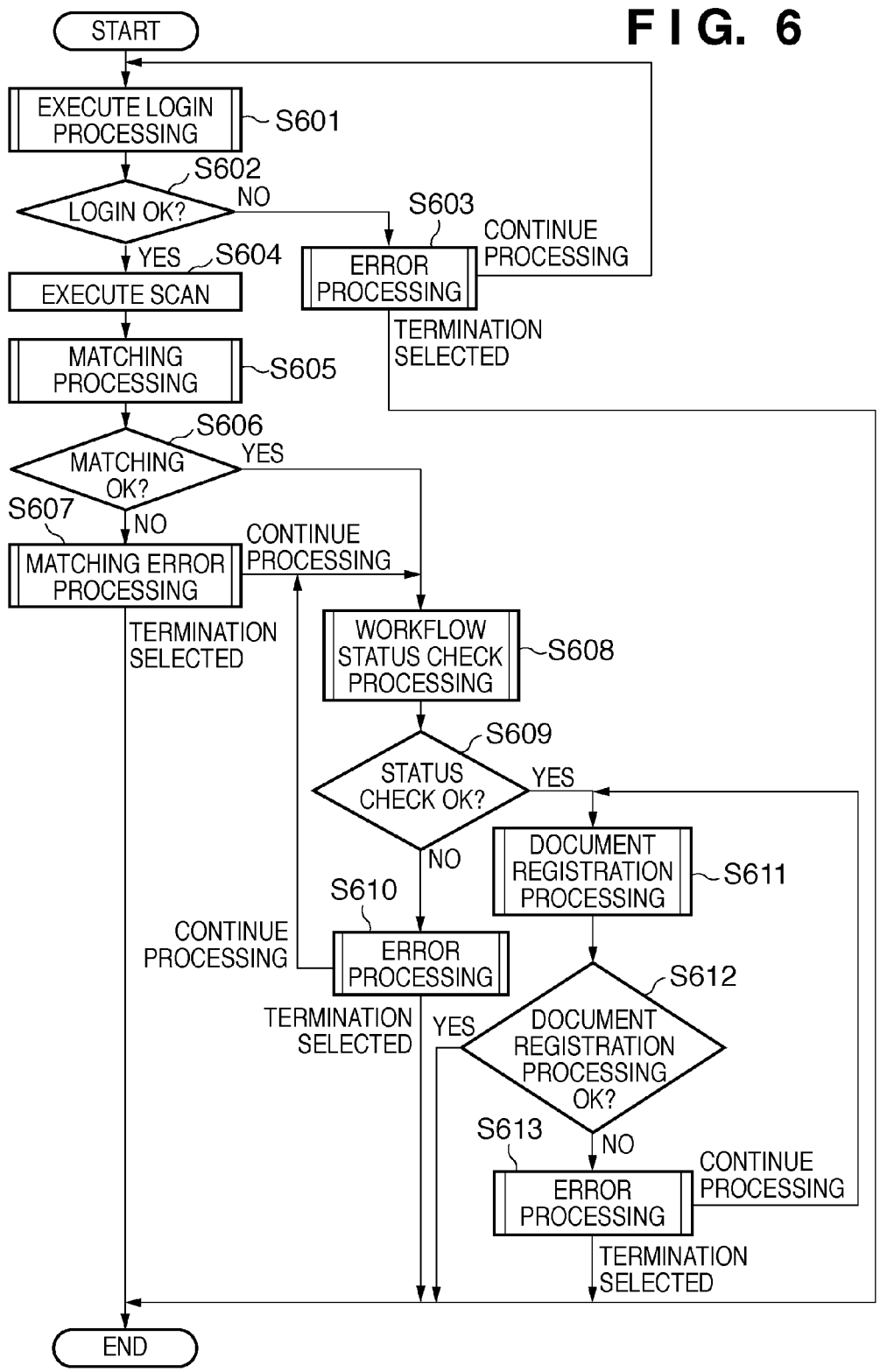
FIG. 6 is a flowchart showing an overview of the control procedure according to the embodiment.

The control procedures upon execution of image processing using the MFP 100 according to this embodiment will be described below with reference to FIGS. 6 to 12. FIG. 6 is a flowchart showing an overview of the control procedure according to this embodiment.

In step S601, the MFP 100 executes user login processing. The MFP 100 then determines in step S602 whether or not the user login processing has succeeded. If the login processing has succeeded, the process advances to step S604; otherwise, the process advances to step S603. In step S603, the MFP 100 executes error processing, thus terminating the processing. The error processing prompts the user to execute login processing again.

On the other hand, the MFP 100 executes scan processing to read a document in step S604. The processes in steps S601 to S604 described so far are those of the MFP 100. Note that the subsequent processes are executed by the template server 200. Subsequently, the processes from step S605 transit to those of the template server 200. Therefore, the MFP 100 transmits data read from the document to the template server 200 in step S604.

In step S605, the template server 200 receives the data transmitted from the MFP 100 and executes matching processing. The matching processing automatically executes matching between the OCR processing result of the data read from the document and templates which are registered in advance in the template server. Subsequently, the template server 200 determines in step S606 whether or not the matching processing has succeeded. If the matching processing has succeeded, the process advances to step S608; otherwise, the process advances to step S609. In step S609, the template server 200 executes matching error processing, and then judges whether or not to continue the processing. If the processing is to be continued, the process advances to step S608; otherwise, the processing is terminated.

In step S608, the template server 200 executes status check processing of a workflow. In this step, the template server 200 analyzes a status of a workflow acquired from the workflow server 300 and that of a workflow used to register the scanned data. The template server 200 determines in step S609 based on the result in step S608 whether or not the statuses of the two workflows match. If these statuses match, the process advances to step S611; otherwise, the process advances to step S610.

In step S610, the template server 200 executes error processing and then judges whether or not to continue the processing. If the processing is to be continued, the process returns to step S608; otherwise, the processing is terminated.

In step S611, the template server 200 executes document registration processing. The document registration processing executes processing for eventually registering the scanned data in the document server 400. Then, the template server 200 determines in step S612 whether or not the registration processing in the document server 400 has succeeded. If the registration processing has succeeded, the processing is terminated; otherwise, the process advances to step S613. In step S613, the template server 200 executes error processing and then judges whether or not to continue the processing. If the processing is to be continued, the process returns to step S611; otherwise, the processing is terminated.

<Matching Processing>

Figure 7:
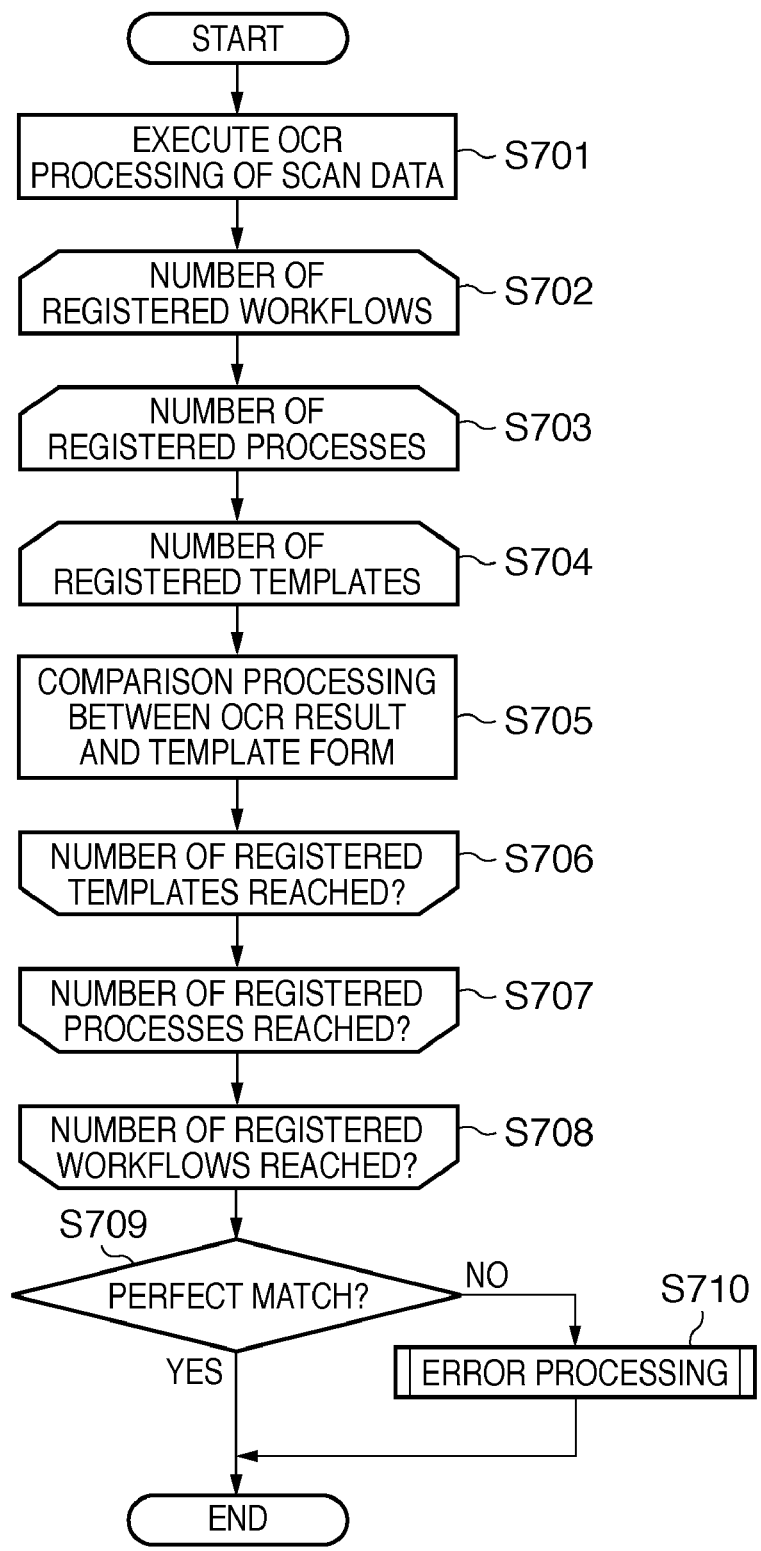
FIG. 7 is a flowchart showing the detailed procedure of matching processing according to the embodiment.

Details of the matching processing in step S605 in FIG. 6 will be described below with reference to FIG. 7. FIG. 7 is a flowchart showing the detailed procedure of the matching processing according to this embodiment. Note that the processes to be described below are executed by the template server 200.

In step S701, the template server 200 executes the OCR processing to the scan data received from the MFP 100. With this processing, the template server 200 specifies ruled line information and the like, which indicate features of the received scan data, and generates feature information of the scan data. After that, in step S705, the template server 200 compares the feature information with templates which are registered in advance in itself.

This comparison processing is repeated as many as the number of registered templates in steps S704 and S706. After that, when the control leaves this loop, the comparison processing is repeated as many as the number of registered processes in steps S703 and S707. Furthermore, when the control leaves this loop, the comparison processing is repeated as many as the number of registered workflows in steps S702 and S708. In this manner, the matching processing with all templates registered in the template server 200 is executed eventually.

Next, the template server 200 determines in step S709 based on the respective matching processing results whether or not a perfectly matched combination is detected. If the matching processing has succeeded, the template server 200 terminates the processing; otherwise, the process advances to step S710. In step S710, the template server 200 executes error processing, thus terminating the processing.

<Error Control>

Figure 8:
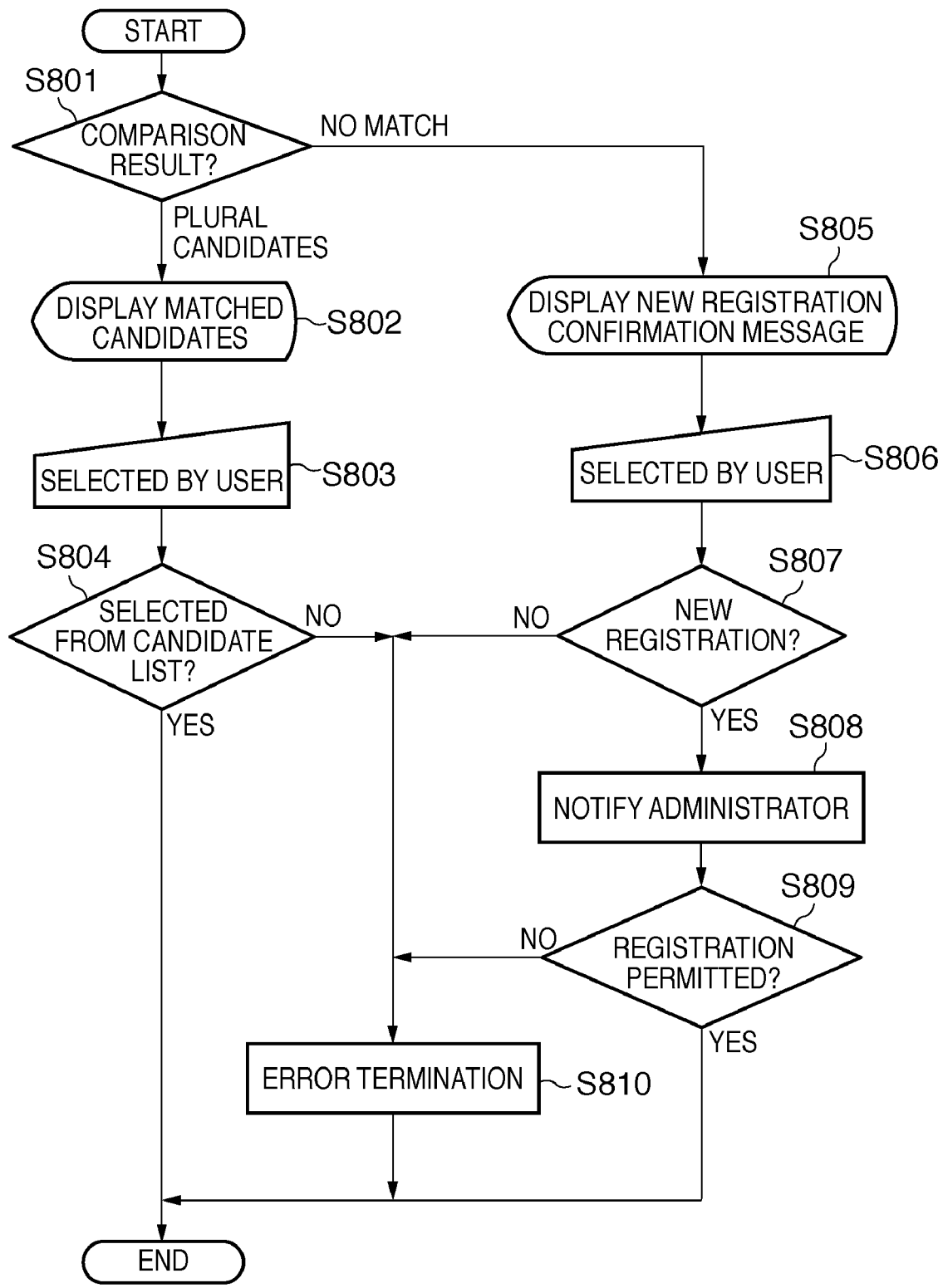
FIG. 8 is a flowchart showing the processing procedure in error control of the matching processing according to the embodiment.

The error control of the matching processing in step S607 in FIG. 6 will be described below with reference to FIG. 8. FIG. 8 is a flowchart showing the processing procedure in the error control of the matching processing according to this embodiment. Note that the processes to be described below are executed by the template server 200.

In step S801, the template server 200 determines the comparison results of the matching processing. This determination process determines a status when the matching processing results in an error. Note that an error of the matching processing indicates a case in which there is no template which perfectly matches the feature information. Note that there are two cases in which the matching processing results in an error, i.e., a case in which there are a plurality of templates having predetermined degrees of matching or more with the feature information, and a case in which there is no template having predetermined degrees of matching or more with the feature information, as a result of the matching processing. This embodiment enumerates one or more templates having predetermined degrees of matching or more with the feature information as candidates whose matching processing has succeeded, and prompts the user to select one of the candidates. If there are a plurality of candidates in step S801, the process advances to step S802; if there is no candidate, the process advances to step S805.

If there are a plurality of candidates, the template server 200 notifies the MFP 100 that there are the plurality of candidates, and instructs the MFP 100 to display these candidates on the display device in step S802. The plurality of candidates are displayed to be selectable by the user. Subsequently, the template server 200 acquires selection information by means of a user input from the MFP 100 in step S803. After that, the template server 200 determines in step S804 based on the acquired selection information whether or not the user selected any of the plurality of displayed candidates. If the user selected a certain candidate, the processing is terminated normally; otherwise, the process advances to step S810. Note that the normal termination means that the selected candidate is determined as a successfully matched template, and the control advances to the process in step S608 in FIG. 6 to continue the processing of the template server 200.

On the other hand, if it is determined in step S801 that there is no matched template, the template server 200 instructs the MFP 100 to display on the display device a message that confirms the user as to whether or not to register the scanned data as a template, in step S805. After that, upon reception of a notification indicating that a user input is accepted from the MFP 100 in step S806, the template server 200 determines in step S807 whether or not to execute new registration of a template. If the new registration is to be executed, the process advances to step S808; otherwise, the process advances to step S810.

In step S808, the template server 200 sends, to an administrator, an inquiry as to whether or not to execute the new registration. This inquiry is sent to, e.g., an administrator server included in the image processing system 10. After that, the template server 200 receives a response from the administrator and determines in step S809 whether or not the new registration is permitted. If the new registration is permitted, the template server 200 registers that new template, thus normally terminating the processing. On the other hand, if the new registration is not permitted, the process advances to step S810.

In step S810, the template server 200 selects an error termination, and terminates the processing. In this step, for example, the template server 200 sets a flag indicating an error termination, and terminates the processing. After that, whether or not to continue the subsequent processes is judged with reference to this flag in step S607 in FIG. 6.

<Status Check>

Figure 9:
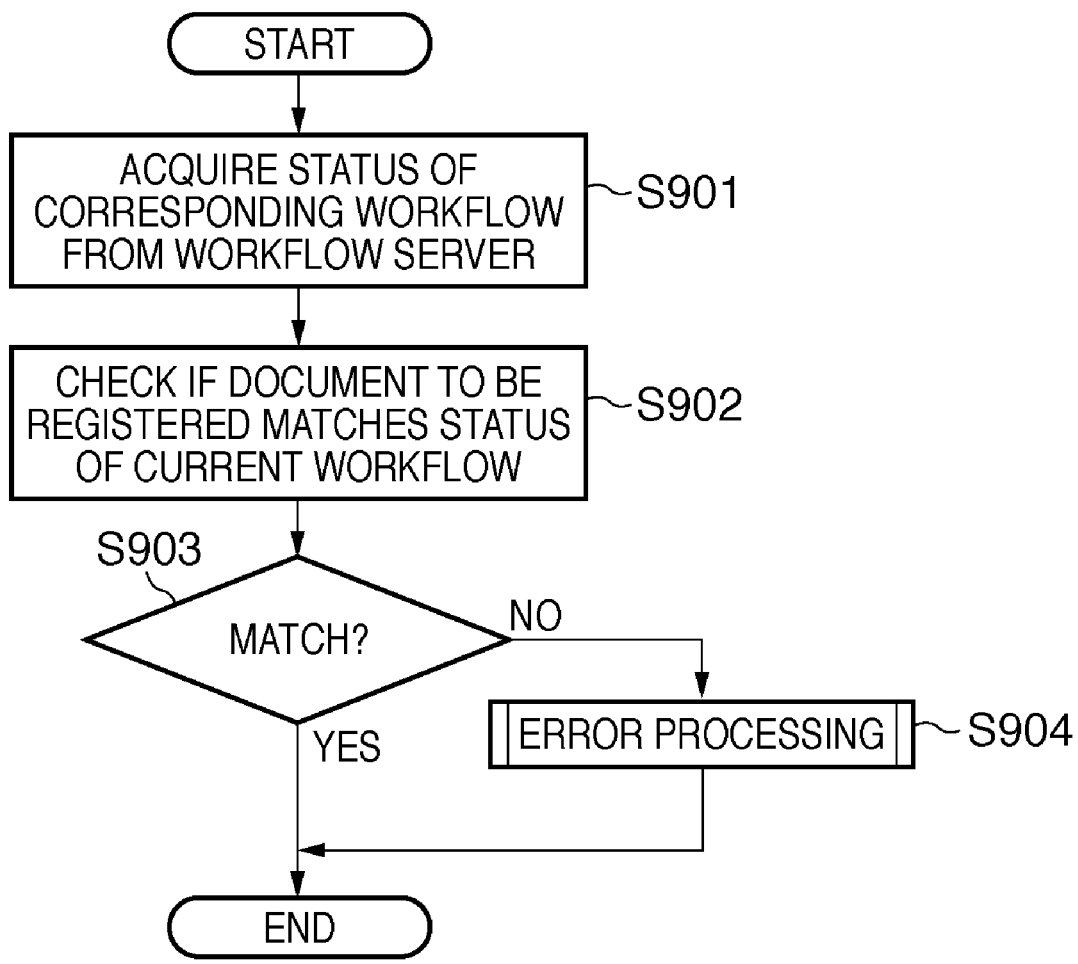
FIG. 9 is a flowchart showing the processing sequence of status check processing according to the embodiment.

The status check processing in step S608 in FIG. 6 will be described below with reference to FIG. 9. FIG. 9 is a flowchart showing the processing procedure of the status check processing according to this embodiment. Note that the processes to be described below are executed by the template server 200.

In step S901, the template server 200 acquires the latest status of a workflow, in which a template file that matches the feature information is registered, from the workflow server 300. The template server 200 then confirms in step S902 if the data to be registered matches the status (process) of an appropriate workflow. That is, the template server 200 confirms validity as to whether or not the data to be registered is that to be registered in a status corresponding to the current process. Note that the workflow holds a plurality of processes. Therefore, every time each process is processed, a status transits to another. Next, the template server 200 determines in step S903 based on the confirmation result of step S902 if the statuses match. If the statuses match, the template server 200 terminates the processing; otherwise, the process advances to step S904. In step S904, the template server 200 executes error processing, thus terminating the processing.

<Error Control>

Figure 10:
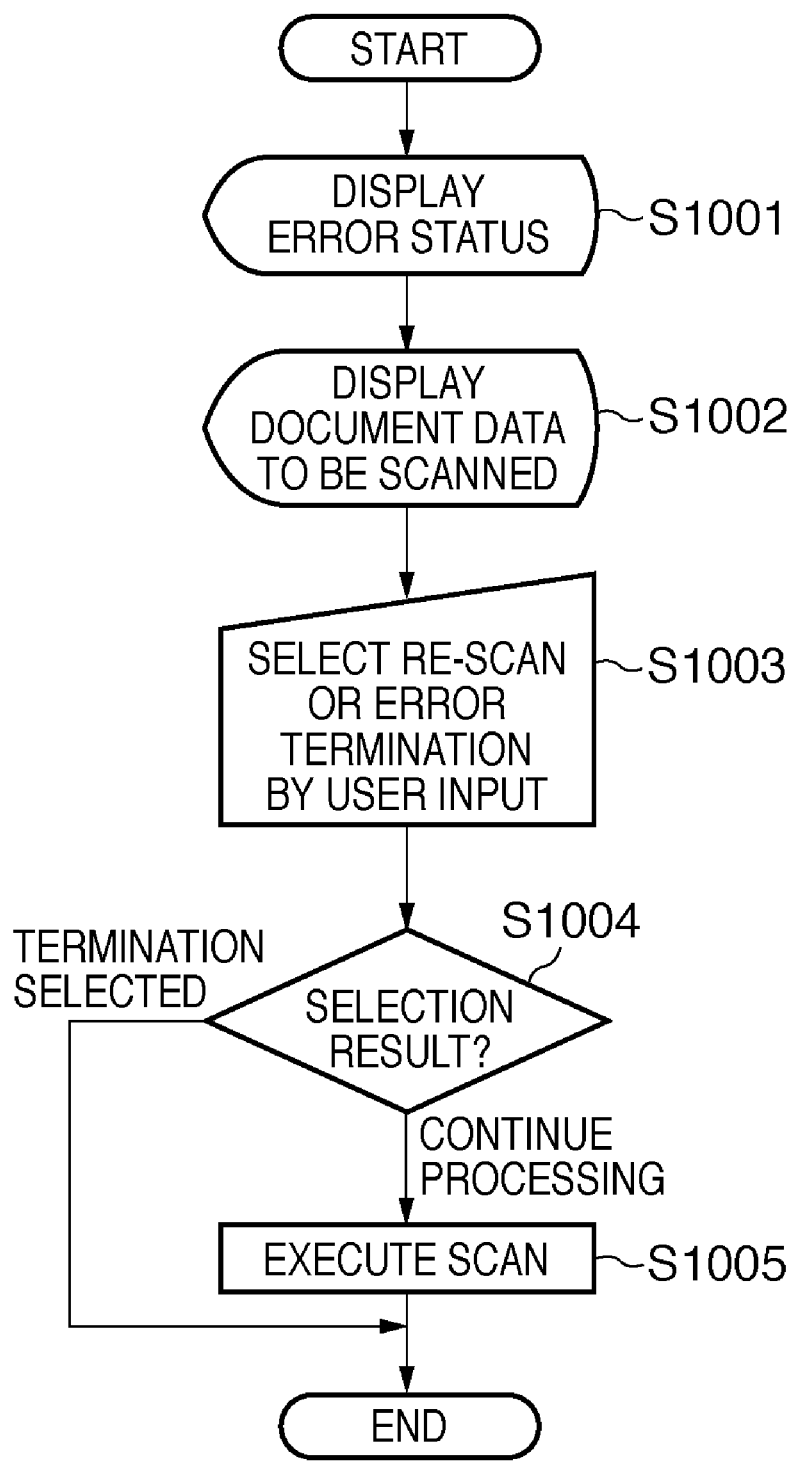
FIG. 10 is a flowchart showing the processing procedure in error control of the status check processing according to the embodiment.

The error control in the status check processing in step S610 in FIG. 6 will be described below with reference to FIG. 10. FIG. 10 is a flowchart showing the processing procedure in the error control of the status check processing according to this embodiment. Note that the processes to be described below are executed by the template server 200. Alternatively, the processes to be described below may be executed by the MFP 100.

In step S1001, the template server 200 notifies the MFP 100 of a status error, and instructs the MFP 100 to display a status mismatch error on the display device. Furthermore, in step S1002, the template server 200 instructs the MFP 100 to display document data to be scanned on the display device.

In step S1003, the template server 200 receives a notification indicating that a user input is accepted from the MFP 100. This notification includes selection information as to whether or not the user executes scan processing again. In step S1004, the template server 200 determines user's selection. If the user selects to execute the scan processing again, the process advances to step S1005 to instruct the MFP 100 to execute the scan processing. On the other hand, if the user does not select to execute the scan processing again, the processing is terminated.

<Registration Processing>

Figure 11:
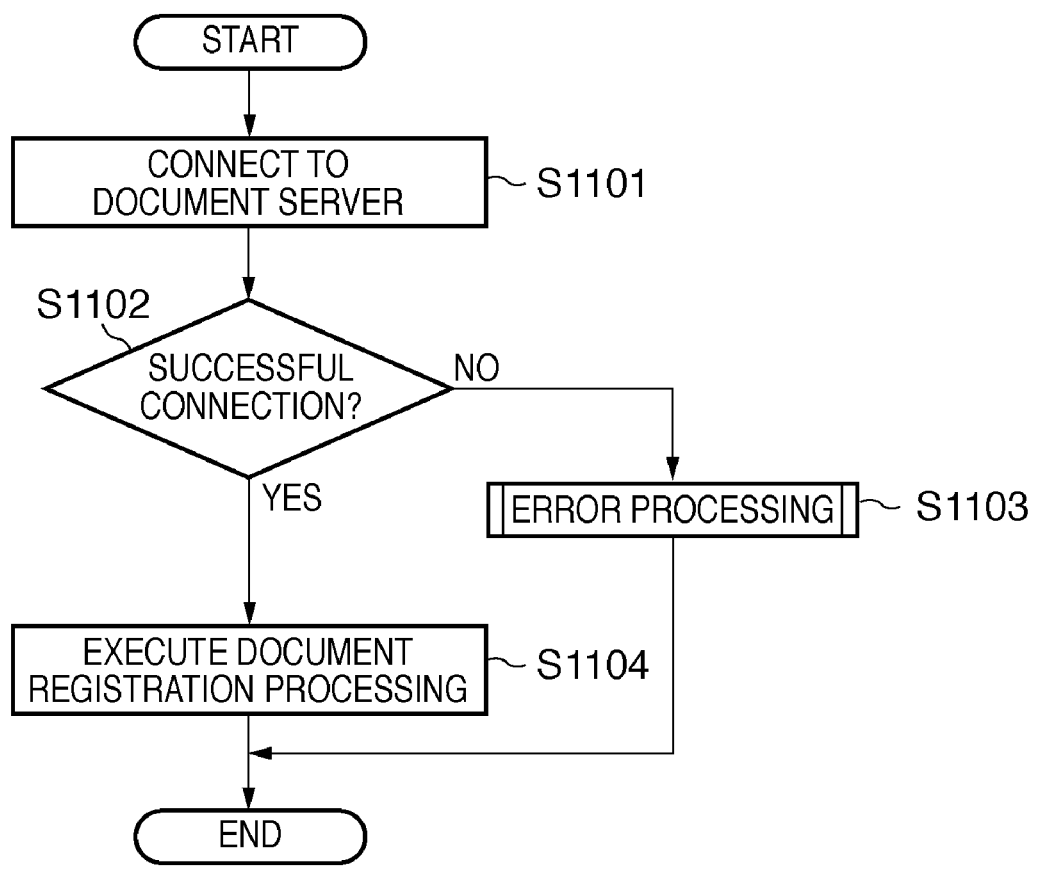
FIG. 11 is a flowchart showing the processing procedure of document registration processing according to the embodiment.

The document registration processing in step S611 in FIG. 6 will be described below with reference to FIG. 11. FIG. 11 is a flowchart showing the processing procedure in the document registration processing according to this embodiment. Note that the processes to be described below are executed by the template server 200.

In step S1101, the template server 200 executes connection processing to the document server 400. After that, the template server 200 determines in step S1102 whether or not the connection processing has succeeded. If the connection processing has succeeded, the process advances to step S1104; otherwise, the process advances to step S1103. In step S1103, the template server 200 executes error processing to terminate the processing. In step S1104, the template server 200 executes the document registration processing.

<Error Control>

Figure 12:
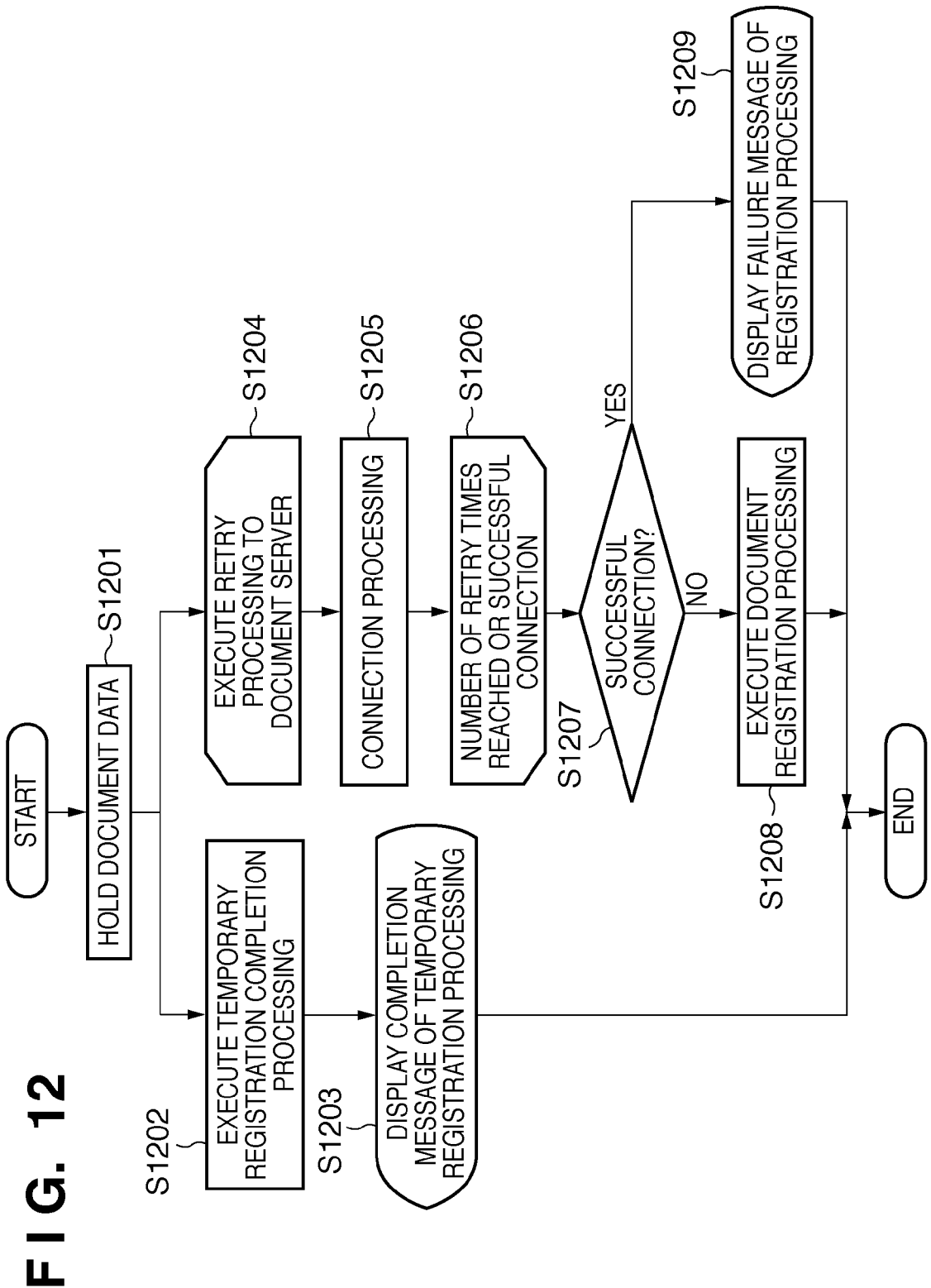
FIG. 12 is a flowchart showing the processing sequence in error control of the document registration processing according to the embodiment.

The error control of the document registration processing in step S613 in FIG. 6 will be described below with reference to FIG. 12. FIG. 12 is a flowchart showing the processing procedure in the error control of the document registration processing according to this embodiment. Note that the processes to be described below are executed by the template server 200.

When an error has occurred at the time of the document server registration, the template server 200 holds the scanned data in step S1201. After that, the template server 200 parallelly executes the processes in step S1202 and subsequent steps and those in step S1204 and subsequent steps.

In step S1202, the template server 200 executes temporary registration processing required to execute the processes in the subsequent steps. Then, in step S1203 the template server 200 instructs the MFP 100 to display a completion message of the temporary registration processing on the display device.

On the other hand, in steps S1204 to S1206, the template server 200 executes retry processing of the connection processing. The retry processing is repeated until the predetermined number of retry times is reached or the connection processing succeeds. The template server 200 determines in step S1207 whether or not the connection processing has succeeded. If the connection processing has failed, the process advances to step S1209, and the template server 200 instructs the MFP 100 to display, on the display device, a message indicating that the document registration processing has failed. On the other hand, if the connection processing has succeeded, the process advances to step S1208. In step S1208, the template server 200 executes the document registration processing.

Screen Example

Figure 13:
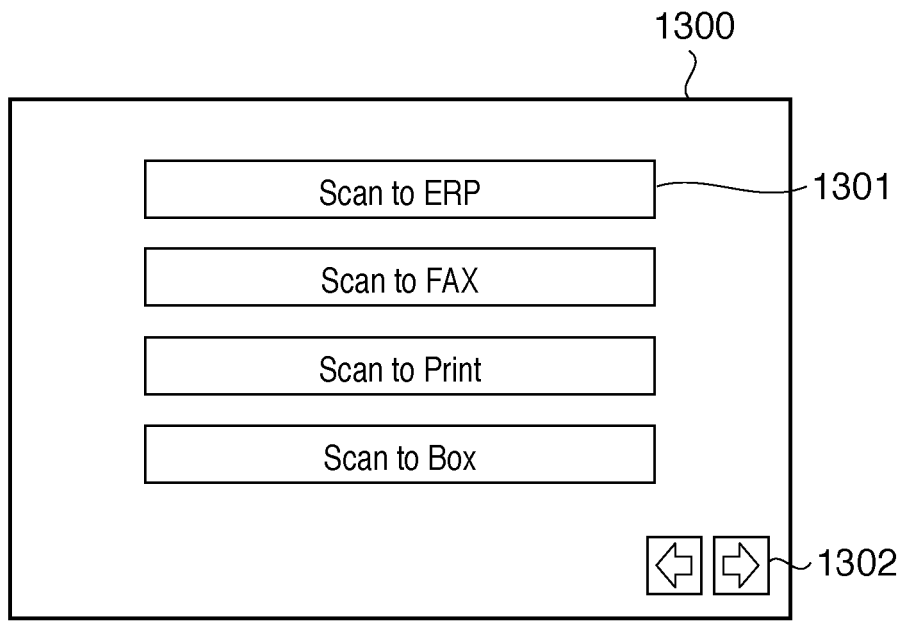
FIG. 13 is a view showing a display screen 1300 displayed on the MFP 100 according to the embodiment.

Screen examples displayed on the display device of the MFP 100 will be described below with reference to FIGS. 13 to 21. FIG. 13 is a view showing a display screen 1300 displayed on the MFP 100 according to this embodiment. For example, the display screen 1300 is displayed on the MFP 100 so as to allow the user to make settings about scan processing upon execution of the scan processing in step S604 in FIG. 6.

The display screen 1300 displays menu related to the scan processing. The user selects a process to be executed from various displayed menus. This screen displays processing menus related to the scan processing. For example, when the user selects a button 1301, the registration processing of the scanned document, which has been described in this embodiment, is executed. Buttons 1302 are next and previous page buttons used when one screen cannot display all menus.

Figure 14:
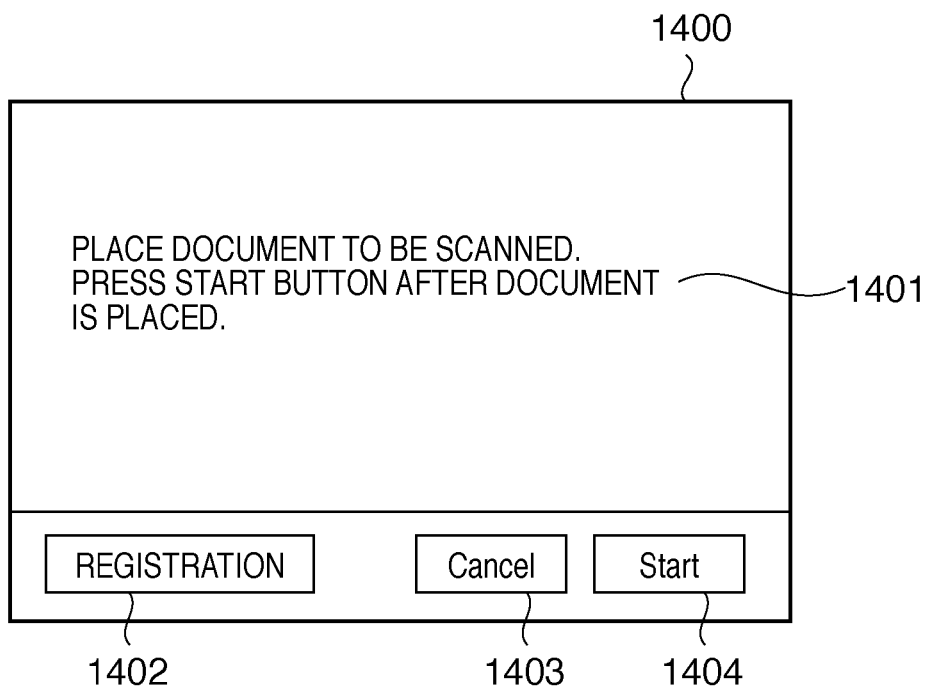
FIG. 14 is a view showing a display screen 1400 displayed on the MFP 100 according to the embodiment.

FIG. 14 is a view showing a display screen 1400 displayed on the MFP 100 according to this embodiment. The display screen 1400 is displayed when the user selects the button 1301 on the display screen 1300. For example, the display screen 1400 is displayed to start the scan processing in step S604 in FIG. 6.

A display area 1401 displays a message for an operation required to execute the next processing. A button 1402 is selected when the user wants to register a document to be scanned in the template server 200 as a template. A button 1403 is used to close the display screen 1400 and to return to the display screen 1300. A button 1404 is used to start scan processing and to execute various subsequent processes.

Figure 15:
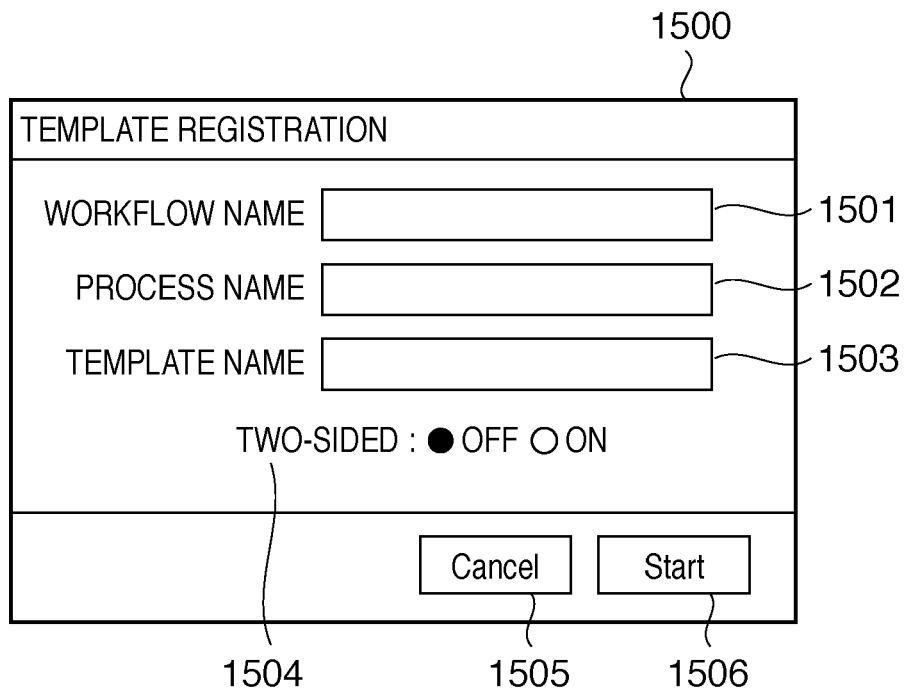
FIG. 15 is a view showing a display screen 1500 displayed on the MFP 100 according to the embodiment.

FIG. 15 is a view showing a display screen 1500 displayed on the MFP 100 according to this embodiment. The display screen 1500 is displayed when the user selects the button 1402 on the display screen 1400. For example, the display screen 1500 is displayed as an input screen that allows the user to make various settings when he or she selects the document registration processing upon execution of the scan processing in step S604 in FIG. 6.

The display screen 1500 allows the user to make various settings upon registration of a scanned document in the template server 200 as a template. A field 1501 is used to input a workflow name which links scanned data. A field 1502 is used to input a process name indicating a process to be linked in the workflow input in the field 1501. A field 1503 is used to input a template name upon registering the scanned document in the template server 200 as a template. Selection buttons 1504 are used to select a two-sided setting upon registration as a template. When the user selects two-sided setting ON, the template server 200 registers both the faces of a document as a template. On the other hand, when the user selects two-sided setting OFF, the template server 200 registers one face of a document as a template. A button 1505 is a cancel button, and when the user selects this button, the display screen returns to the display screen 1400. A button 1506 is used to start template registration, and when the user selects this button, the scan processing and OCR processing are executed in turn.

Figure 16:
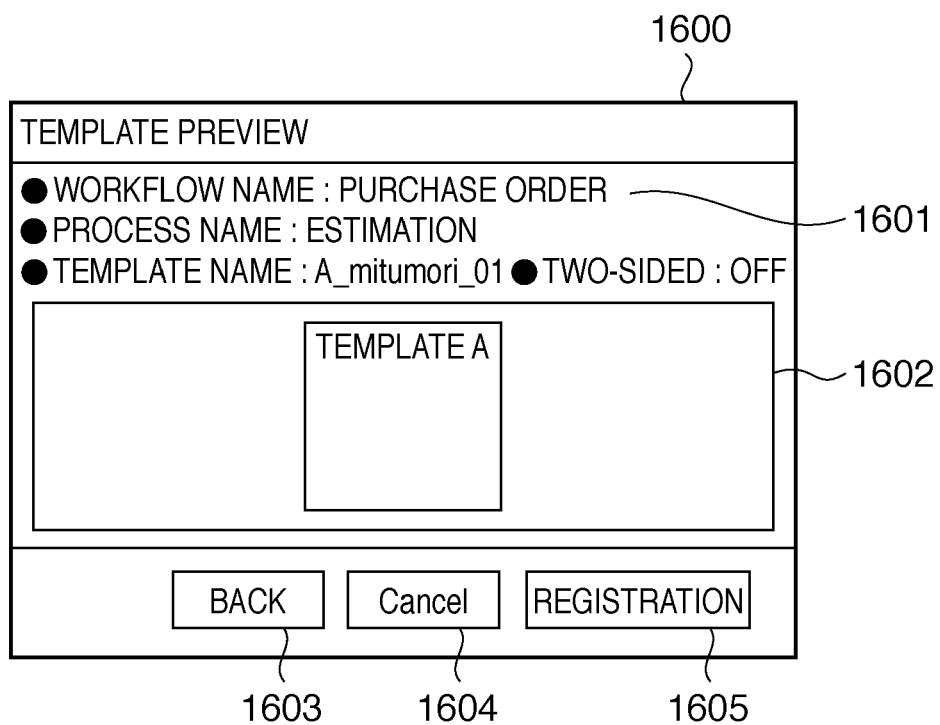
FIG. 16 is a view showing a display screen 1600 displayed on the MFP 100 according to the embodiment.

FIG. 16 is a view showing a display screen 1600 displayed on the MFP 100 according to this embodiment. The display screen 1600 is displayed when the user selects the button 1506 on the display screen 1500. For example, the display screen 1600 is displayed on the MFP 100 to allow the user to confirm his or her settings associated with the document registration processing upon execution of the scan processing in step S604 in FIG. 6.

The display screen 1600 displays a preview of a template when the user registers the scanned document in the template server 200 as a template. A display area 1601 displays various setting items set on the display screen 1500. A display area 1602 displays a preview of the scanned data. A button 1603 is a back button, and when the user selects this button, the display screen returns to the display screen 1500. A button 1604 is a cancel button, and when the user selects this button, the display screen returns to the display screen 1400. A button 1605 is a registration button, and when the user selects this button, the processing for converting the scanned document into a template and saving the template in the template server 200 is executed.

Figure 17:
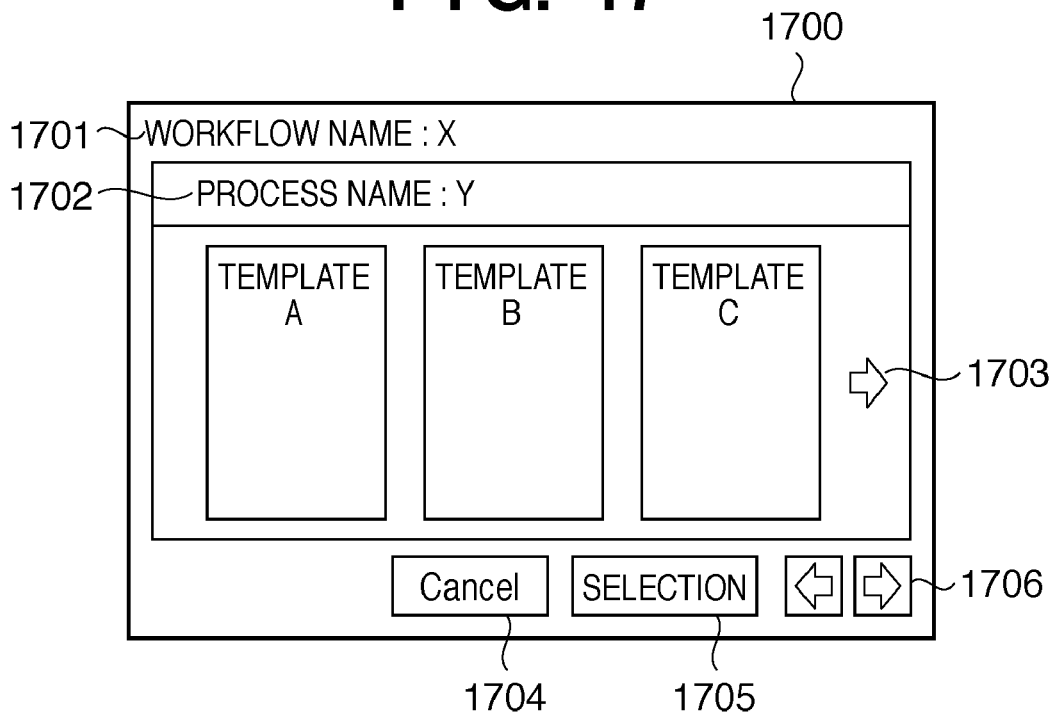
FIG. 17 is a view showing a display screen 1700 displayed on the MFP 100 according to the embodiment.

FIG. 17 is a view showing a display screen 1700 displayed on the MFP 100 according to this embodiment. The display screen 1700 corresponds to a template selection screen example when a plurality of templates are detected as matched candidates in the matching processing. For example, the display screen 1700 is displayed on the MFP 100 to prompt the user to select a matched candidate of a template in step S802 in FIG. 8.

A display area 1701 displays a workflow name of a candidate. A display area 1702 displays a process name included in that workflow. A display area 1703 displays previews of a plurality of templates. Buttons 1706 are next and previous page buttons. A button 1704 is a cancel button, and when the user selects this button, the document registration processing is terminated as an error. A button 1705 is a selection button. When the user selects this button, a template is uniquely decided, and the processes in the subsequent steps are continuously executed.

Figure 18:
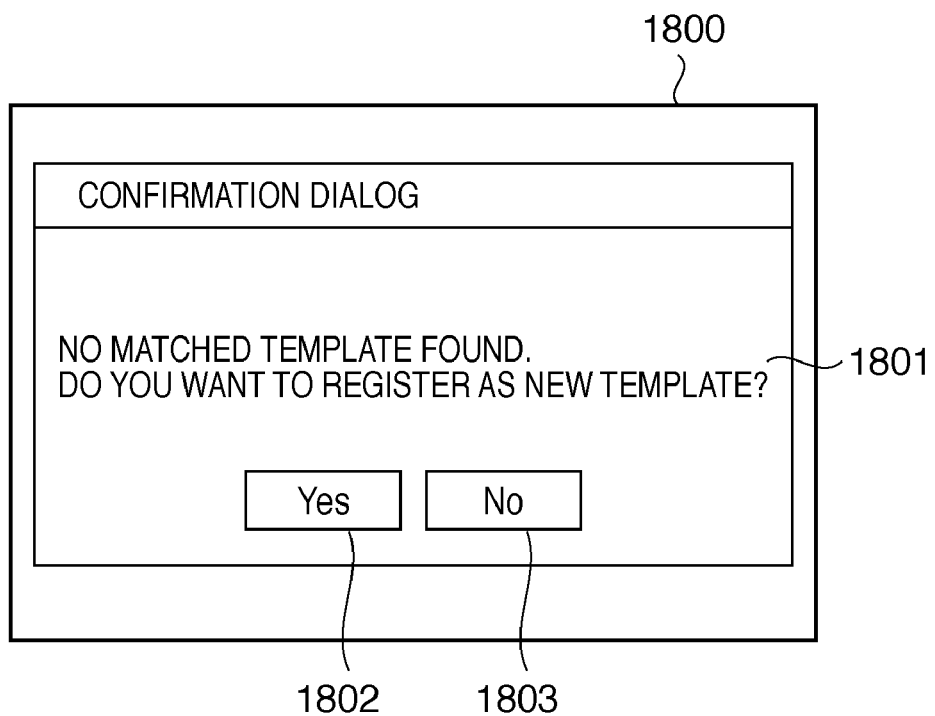
FIG. 18 is a view showing a display screen 1800 displayed on the MFP 100 according to the embodiment.

FIG. 18 is a view showing a display screen 1800 displayed on the MFP 100 according to this embodiment. The display screen 1800 is a screen example displayed when no matched template is detected in the matching processing. For example, the display screen 1800 is displayed on the MFP 100 to confirm the user as to whether or not to execute new registration of the scanned document in step S805 in FIG. 8.

A display area 1801 displays a message that prompts the user to select the next action. A button 1802 is a Yes button, and when the user selects this button, processing for registering the scanned document as a new template is continued. A button 1803 is a No button, and when the user selects this button, the processing is terminated as an error.

FIG. 19 is a view showing a display screen 1900 displayed on the MFP 100 according to this embodiment. The display screen 1900 is a screen example displayed when statuses do not match in the status check processing of a workflow. For example, the display screen 1900 is displayed on the MFP 100 when statuses do not match in step S1001 in FIG. 10.

A display area 1901 displays a message when the statuses do not match and it is determined that the statuses are invalid. This message is displayed to prompt the user to register a registration template name. A button 1902 is a Yes button. When the user selects this button, it is determined that a document of the designated correct template is set on the scanner of the MFP 100 as a document to be scanned, and the scan processing is executed again. A button 1903 is a No button, and when the user selects this button, the processing is terminated as an error.

FIG. 20 is a view showing a display screen 2000 displayed on the MFP 100 according to this embodiment. The display screen 2000 is displayed when an error has occurred upon registration of data from the template server 200 to the document server 400. For example, the display screen 2000 is displayed on the MFP 100 to notify the user of completion of temporary registration in step S1203 in FIG. 12.

A display area 2001 displays a message indicating that an error has occurred at the time of document registration, and temporary registration was executed. A button 2002 is an OK button, and when the user selects this button, the display screen returns to the display screen 1300.

Figure 21:
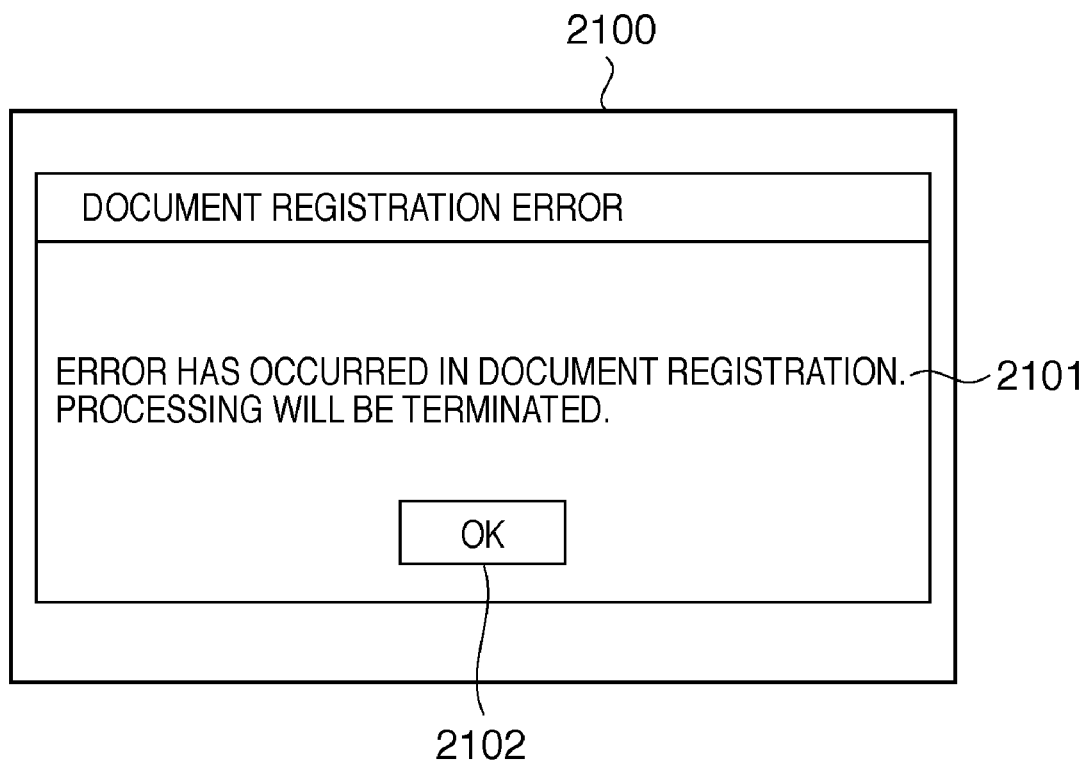
FIG. 21 is a view showing a display screen 2100 displayed on the MFP 100 according to the embodiment.

FIG. 21 is a view showing a display screen 2100 displayed on the MFP 100 according to this embodiment. The display screen 2100 is a screen example displayed when an error has occurred at the time of data registration in the document server 400, and the registration processing has failed eventually although the retry processing was executed while executing temporary registration. For example, the display screen 2100 is displayed on the MFP 100 when the document registration processing has failed in step S1209 in FIG. 12. A display area 2101 displays a failure message of document registration. A button 2102 is an OK button, and when the user selects this button, the display screen returns to the display screen 1300.

As described above, the image processing system according to this embodiment specifies feature information from a document to be registered, and executes matching between the feature information and templates which are held in advance. Furthermore, in this embodiment, when matching has succeeded, the validity of attribute information liked with the corresponding template and the processing status of a workflow which is being currently executed is determined. If the attribute information and the processing status are valid, the document is registered in the document server. Then, the image processing system can register a document by automatically judging validity of digital data read from the document and the processing status of a workflow which is being executed, thus reducing the user's operation load, and allowing to execute document registration processing with high reliability.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-063233 filed on Mar. 16, 2009, which is hereby incorporated by reference herein in its entirety.

What is claimed is:

1. An image processing system comprising a workflow server, a template server, and an image processing apparatus,
   the workflow server comprising
      a first storage unit that stores a workflow in which a plurality of processes are defined, and
      a management unit that manages a processing status of the workflow stored in the first storage unit;
   the image processing apparatus comprising
      a reading unit that reads a document and outputs digital data, and
      a transmission unit that transmits the digital data output from the reading unit to the template server; and
   the template server comprising
      a second storage unit that stores templates each indicating a feature of a document in association with specific processes included in the workflow managed by the workflow server,
      a generation unit that generates feature information from the digital data transmitted by the transmission unit,
      a specifying unit that specifies a process which is defined in the workflow stored in the first storage unit, based on the feature information generated by the generation unit and the templates stored in the template server,
      a judging unit that judges, based on a processing status, managed by the management unit, of the workflow which defines the process specified by the specifying unit, whether or not to execute the process, and
      a processing unit that processes, in a case where the judging unit judges that the process specified by the specifying unit is to be executed, the digital data output from the reading unit.

2. The system according to claim 1, wherein the specifying unit executes matching between the feature information generated by the generation unit and the templates stored in the template server, and specifies a process stored in the second storage unit in association with the template whose matching has succeeded.

3. The system according to claim 2, further comprising:
   a unit that displays, in a case where the matching by the specifying unit has failed and one or more templates having not less than predetermined degrees of matching with the feature information generated by the generation unit are detected, a selection screen that allows to select a specific template among the one or more templates, on a display unit of the image processing apparatus; and
   a unit that acquires selection information input by a user via the selection screen,
   wherein processing by the processing unit is continued in a case where the selection information indicates that the specific template is selected, and error processing is executed to terminate the processing by the processing unit in a case where the selection information indicates that the specific template is not selected.

4. The system according to claim 2, further comprising:
   a unit that displays, in a case where the matching by the specifying unit has failed and a template having not less than predetermined degrees of matching with the feature information generated by the generation unit is not detected, a selection screen that allows to select whether or not to register a new template generated from the feature information, on a display unit of the image processing apparatus; and
   a unit that acquires selection information input by a user via the selection screen,
   wherein processing by the processing unit is continued in a case where the selection information indicates that the new template is to be registered, and error processing is to be executed to terminate the processing by the processing unit in a case where the selection information indicates that the new template is not to be registered.

5. The system according to claim 4, further comprising a unit that sends, in a case where the selection information indicates that the new template is to be registered, an inquiry as to whether or not the new template is to be registered to an administrator server included in the image processing system.

6. The system according to claim 2, further comprising a unit that displays, in a case where the matching by the specifying unit has failed, the template corresponding to the process indicated by the processing status managed by the management unit on a display unit of the image processing apparatus.

7. The system according to claim 1, wherein the processing status managed by the management unit indicates a process to be executed of the plurality of processes which are defined in the workflow stored in the first storage unit.

8. The system according to claim 1, wherein the processing unit registers the digital data output from the reading unit in a document server included in the image processing system.

9. The system according to claim 8, wherein in a case where the processing unit registers the digital data in the document server, and in a case where connection processing to the document server has failed, the processing unit executes retry processing up to a predetermined number of times.

10. The system according to claim 1, wherein the template server further comprises a unit that displays an input screen that allows to input a workflow name, a process name, and a template name to be associated with a new template on a display unit of the image processing apparatus when registering the new template.

11. An information processing apparatus which is configured to be connected to a workflow server that stores a workflow in which a plurality of processes are defined, and manages a processing status of the stored workflow, and an image processing apparatus that transmits digital data which is output by reading a document, the apparatus comprising:
 a storage unit that stores templates each indicating a feature of a document in association with specific processes included in the workflow managed by the workflow server;
 a generation unit that generates feature information from the digital data transmitted from the image processing apparatus;
 a specifying unit that specifies a process which is stored in the storage unit and is defined in the workflow, based on the feature information generated by the generation unit and the templates stored in the storage unit;
 a judging unit that judges, based on a processing status, managed by the workflow server, of the workflow which defines the process specified by the specifying unit, whether or not to execute the process; and
 a processing unit that processes, in a case where the judging unit judges that the process specified by the specifying unit is to be executed, the digital data output from the image processing apparatus.

12. A method of controlling an image processing system comprising a workflow server, a template server, and an image processing apparatus,
 the method comprising: causing the workflow server to execute
 storing a workflow in which a plurality of processes are defined, and
 managing a processing status of the workflow stored in the storing the workflow;
 causing the image processing apparatus to execute
 reading a document and outputting digital data, and
 transmitting the digital data output in the reading to the template server; and
 causing the template server to execute
 storing templates each indicating a feature of a document in association with specific processes included in the workflow managed by the workflow server,
 generating feature information from the digital data transmitted in the transmitting,
 specifying a process defined in the workflow stored in the storing the workflow, based on the feature information generated in the generating and the templates stored in the template server,
 judging, based on a processing status, managed in the managing, of the workflow which defines the process specified in the specifying, whether or not to execute the process, and
 processing, in a case where it is judged in the judging that the process specified in the specifying is to be executed, the digital data output in the reading.

13. A method of controlling an information processing apparatus which is configured to be connected to a workflow server that stores a workflow in which a plurality of processes are defined, and manages a processing status of the stored workflow, and an image processing apparatus that transmits digital data which is output by reading a document, the method comprising:
 storing templates each indicating a feature of a document in association with specific processes included in the workflow managed by the workflow server;
 generating feature information from the digital data transmitted from the image processing apparatus;
 specifying a process which is stored in the storing and is defined in the workflow, based on the feature information generated in the generating and the templates stored in the storing;
 judging, based on a processing status, managed by the workflow server, of the workflow which defines the process specified in the specifying, whether or not to execute the process; and
 processing, in a case where it is judged in the judging that the process specified in the specifying is to be executed, the digital data output from the image processing apparatus.

14. A computer-readable storage medium storing a computer program for making a computer execute respective steps in a method of controlling an image processing system according to claim 12.

15. A computer-readable storage medium storing a computer program for making a computer execute respective steps in a method of controlling an information processing apparatus according to claim 13.

* * * * *